(12) United States Patent
Okamoto et al.

(10) Patent No.: US 10,365,164 B2
(45) Date of Patent: Jul. 30, 2019

(54) OPTICAL SYSTEM PHASE ACQUISITION METHOD AND OPTICAL SYSTEM EVALUATION METHOD

(71) Applicant: USHIO DENKI KABUSHIKI KAISHA, Tokyo (JP)

(72) Inventors: Masashi Okamoto, Tokyo (JP); Tsukasa Matsuo, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 15/651,915

(22) Filed: Jul. 17, 2017

(65) Prior Publication Data

US 2018/0024008 A1  Jan. 25, 2018

(30) Foreign Application Priority Data

Jul. 20, 2016 (JP) .................................. 2016-142070
Feb. 20, 2017 (JP) .................................. 2017-029097

(51) Int. Cl.

| *G01J 9/02* | (2006.01) |
| *G01B 9/021* | (2006.01) |
| *G01M 11/02* | (2006.01) |
| *G03H 1/08* | (2006.01) |

(Continued)

(52) U.S. Cl.

CPC ................ *G01J 9/02* (2013.01); *G01B 9/021* (2013.01); *G01B 9/02032* (2013.01); *G01B 9/02047* (2013.01); *G01M 11/0271* (2013.01); *G03H 1/0443* (2013.01); *G03H 1/0866* (2013.01);

(Continued)

(58) Field of Classification Search

CPC ........... A61B 5/0066; G06T 7/55; G06T 5/50; G06T 2207/20216; G06T 2207/10101; G06T 2207/10148; G06T 2207/20221; G01N 21/25; G01B 9/02044; G01B 9/02084; G01B 9/02091; G01B 9/021; G01J 9/02

See application file for complete search history.

(56) References Cited

U.S. PATENT DOCUMENTS

| 7,649,160 B2 | 1/2010 | Colomb et al. |
| 2004/0246604 A1* | 12/2004 | Fiete ......................... G01J 9/00 359/850 |
| 2008/0259345 A1 | 10/2008 | Fukutake | |

FOREIGN PATENT DOCUMENTS

| JP | 2002-526815 A | 8/2002 |
| JP | 2003-098040 A | 4/2003 |

(Continued)

*Primary Examiner* — Hwa Andrew Lee
(74) *Attorney, Agent, or Firm* — Studebaker & Brackett PC

(57) ABSTRACT

When an optical system is illuminated with illumination light fluxes emitted from respective input image points, an interference image generated by superimposing output light fluxes output from the optical system and a reference light flux coherent with the output light fluxes is imaged to acquire interference image data collectively including information of an interference image about all input image points. Diffractive optical light propagation simulation is performed to acquire a phase distribution associated with only light emitted from a single input image point at a position where reconstructed light fluxes to the respective output light fluxes are separated into each light flux. In each input image point, this simulation is performed to acquire a phase distribution on an exit pupil plane.

3 Claims, 6 Drawing Sheets

(51) Int. Cl.
    *G03H 1/04*          (2006.01)
    *G01B 9/02*          (2006.01)

(52) U.S. Cl.
    CPC ................ *G03H 2001/045* (2013.01); *G03H 2001/0445* (2013.01)

(56) References Cited

FOREIGN PATENT DOCUMENTS

| | | |
|---|---|---|
| WO | 00/20929 A1 | 4/2000 |
| WO | 2008/123408 A1 | 10/2008 |

* cited by examiner

Fig. 6a

$$H_{(\rho,\theta)} = \sum_{n=0}^{N} \sum_{m=-n}^{n} A_{nm} \cdot Z_{nm(\rho,\theta)}$$

($n$-$m$ : Even number)

Fig. 6b

$$Z_{nm(\rho,\theta)} = R_{nm(\rho)} \cdot f_{m(\theta)}$$

Fig. 6c

$$R_{nm(\rho)} = \sum_{s=0}^{\frac{n-m}{2}} (-1)^s \frac{(n-s)!}{s! \cdot \left(\frac{n+m}{2} - s\right)! \cdot \left(\frac{n-m}{2} - s\right)!} \rho^{n-2s}$$

$$\left(\frac{n+m}{2} - s \geq 0\right)$$

Fig. 6d

$$f_{m(\theta)} = \begin{cases} \cos m\theta & (m > 0) \\ 1 & (m = 0) \\ \sin m\theta & (m < 0) \end{cases}$$

OPTICAL SYSTEM PHASE ACQUISITION METHOD AND OPTICAL SYSTEM EVALUATION METHOD

BACKGROUND OF THE INVENTION

Field of the Invention

The present invention uses a technology used in so-called digital holographic imaging, and in a realistic image forming optical system, this invention relates to a method of efficiently acquiring a phase distribution of light with respect to each input image point on an exit pupil plane of the optical system or the like that is useful when the optical system is evaluated. The realistic image forming optical system is configured by, for example, coaxially arranging one or more image forming optical elements such as a lens having a refractive surface of a concave surface or a convex surface, a lens (GRIN lens) achieved by the fact that a refractive medium has a specific refractive index distribution, and a mirror having a reflective surface of a concave surface or a convex surface. In this method, input image points located at prescribed input image spatial coordinates are input to acquire interference image data, and, for example, OTF and Zernike expanding coefficients are calculated, including a case where the optical system includes aberration as designed, error in profile of a refractive surface or a reflective surface of each image forming optical element, and defects such as eccentricity, surface distance error, and assembly error such as tilt, whereby the optical system is evaluated.

Description of the Related Art

By virtue of the development of pixel densification in a recent imaging element such as CCD and CMOS image sensor, the increase in the capacity of a storage of a calculator, and speeding up of calculation, a digital holographic imaging technology can be relatively easily applied.

The digital holographic imaging technology will be described here. In the original optical holography, a photographic plate on which a hologram interference fringe is recorded is developed, and an image of a stereoscopic image reconstructed by being illuminated with light having the same condition as that of reference light irradiated during recording is formed using an imaging element instead of the photographic plate, whereby a hologram interference fringe is acquired as digital data. An optical phenomenon that may occur when the hologram interference fringe is irradiated with light is simulated using a computer, whereby a stereoscopic image is reconstructed.

As the contents of the simulation, a bright and dark pattern of an imaged hologram interference fringe is regarded as an optical filter whose light transmittance changes depending on a position on a plane. Assuming a case where this is irradiated with light, the transmitted light, that is, light subjected to amplitude modulation while depending on the position on the plane propagates in a space as wave motion, and light electric field distribution formed on a virtual plane defined at an arbitrary rear position is reconstructed including phase information.

Accordingly, when the position of the virtual plane is taken on an output image plane of an optical system, the real image or virtual image can be reconstructed and confirmed.

Here, the light propagation is a diffraction phenomenon called a Fresnel diffraction or Fraunhofer diffraction according to propagation distance conditions, and although the simulation is performed by diffractive optical light propagation simulation in which a possible approximation is applied to the formula called Kirchhoff-Huygens diffraction integral formula, the simulation is usually formulated such that light wave motion is a light electric field of complex numbers (a vibration component depending on the time is omitted).

Note that, including history, a method of digital holographic imaging is described in WO2008/123408.

As described above, in the digital holographic imaging, in order to perform the diffractive optical light propagation simulation, a phase of a light flux can be determined in addition to reconstruction of a stereoscopic image. Therefore, for example, when a light flux from a certain image point is input to a realistic image forming optical system, information of an output light flux is acquired by applying the digital holographic imaging, and when a phase distribution of the light flux on a certain cross-section (for example, an exit pupil plane) is measured, it is considered that wavefront aberration and the like can be evaluated as if measurement was performed with an interferometer.

However, in order to evaluate output wavefront to off-axis input image points with different angles of view, a hologram interference fringe is required to be imaged for each image point to be input. For example, as compared to evaluation using a test pattern, it is predicted that, although quantitative performance and accuracy of measurement increase, it is inferior in terms of efficiency.

Accordingly, in the digital holographic imaging, it is required to improve efficiency of inputting input image points to an optical system and acquiring a phase distribution of light on an exit pupil plane or the like that corresponds to each input image point.

As an apparatus which evaluates an optical system with the use of the digital holographic imaging technology, JP-A-2003-098040 describes an evaluation apparatus which numerically reproduces a light wave passing through a tested optical system (lens) and obtains a light amount distribution of the light wave passing through the tested optical system on a plane substantially perpendicular to an optical axis.

It is further described that a beam diameter of the reproduced light wave, distribution profile, and so on are examined.

It is further described that ray tracing simulation is performed using surface form data of lens and internal refractive index distribution data of the lens together, thus obtaining equiphase plane data.

It is further described that the influence of birefringence inside the lens on a passage optical wavefront of the lens is examined based on a difference between the equiphase plane data, obtained by the ray tracing simulation based on the surface form data of the lens and the internal refractive index distribution data of the lens, and equiphase plane data of an optical wavefront reproduced based on hologram image data.

It is further described that the light wave passing through the tested optical system is numerically reproduced, and in an optical axis direction of the light wave passing through the tested optical system, light amount distribution of the light wave passing through the tested optical system on a plane substantially perpendicular to the optical axis is obtained.

It is further described that the overall influence of internal non-uniformity of each lens used in a scanning optical system on the light wave passing through the tested optical system is examined.

It is furthermore described that the overall influence of birefringence of each lens used in the optical system on the light wave passing through the tested optical system is examined.

JP-W-2002-526815 describes a technique of acquiring a phase contrast image by digital holographic imaging and multiplying a phase mask function in order to correct an aberration of a magnification or demagnification optical system.

U.S. Pat. No. 7,649,160 describes a technique of automatically or semi-automatically correcting defects of an image due to tilt of an optical axis for off-axis, an aberration of an objective lens or the like, error in adjustment of an optical system, defocusing, hand movement, and so on with the use of digital wavefront operation of digital holographic imaging.

As described above, the above prior arts evaluate physical characteristics inside an optical system, light quantity distribution of an output light flux, and so on with the use of the digital holographic imaging technology or correct defects of a taken image due to aberration of the optical system and defects of photographing conditions and thus cannot improve efficiency of inputting input image points to the optical system and acquiring a phase distribution of light on an exit pupil plane or the like that corresponds to each input image point.

PRIOR ART DOCUMENTS

Patent Documents

Patent Document 1: WO 2008/123408
Patent Document 2: JP-A-2003-098040
Patent Document 3: JP-W-2002-526815
Patent Document 4: U.S. Pat. No. 7,649,160

BRIEF SUMMARY OF THE INVENTION

An object to be achieved by the present invention is to provide, in a realistic image forming optical system, a technique of efficiently acquiring a phase distribution of light with respect to each input image point that is useful when the optical system is evaluated. In this technique, input image points located at prescribed input image spatial coordinates are simultaneously input to collectively obtain interference image data and evaluating the optical system, including, in addition to aberration as designed, error in profile of a refractive surface or a reflective surface of each image forming optical element and internal presence of defects such as eccentricity, surface distance error, and assembly error such as tilt.

An optical system phase acquisition method according to the first invention of the present invention is a method of acquiring a phase of an optical system (Ot) constituted of one or more image forming optical elements.

This method is characterized by comprising: when the optical system (Ot) is illuminated with illumination light fluxes (Fs1, Fs2, . . . ) emitted from respective input image points (Ps1, Ps2, . . . ) with respect to an input side of the optical system (Ot), imaging, with an imaging element (Uf), an interference image generated by superimposing output light fluxes (Fo1, Fo2, . . . ) output from the optical system (Ot) and a reference light flux (Fr) coherent with the output light fluxes to acquire interference image data (Df) collectively including information of an interference image about the input image points (Ps1, Ps2, . . . );

performing diffractive optical light propagation simulation based on the interference image data (Df) to acquire a broad sense phase distribution $\Psi gj(u'', v'')$ associated with only light emitted from the input image point (Psj) of the input image points (Ps1, Ps2, . . . ), at a position where reconstructed light fluxes to the respective output light fluxes (Fo1, Fo2, . . . ) are separated into each light flux; and performing diffractive optical light propagation simulation based on the broad sense phase distribution $\Psi gj(u'', v'')$ to acquire a broad sense phase distribution $\Psi sj(u, v)$ belonging to the input image point (Psj) on a phase defining plane (T) located at a prescribed relative position with respect to an output side of the optical system (Ot).

An optical system phase acquisition method according to the second invention of the present invention is characterized in that a relay optical system (Oq) is inserted between the optical system (Ot) and the imaging element (Uf) so that output light fluxes (Fo1, Fo2, . . . ) output from the optical system (Ot) are input to the relay optical system (Oq), and the relay optical system (Oq) outputs a relay output light flux which is an output light flux from the relay optical system (Oq), and a target in which an interference image generated by superimposing the reference light flux (Fr) is imaged by the imaging element (Uf) is replaced with the output light fluxes (Fo1, Fo2, . . . ) output from the optical system (Ot) to provide the relay output light flux.

An optical system phase acquisition method according to the third invention of the present invention is a method of evaluating the optical system (Ot).

This method is characterized by comprising: determining a broad sense phase distribution $\Psi sj(u, v)$ on the phase defining plane (T) with respect to the input image point (Psj) of the input image points (Ps1, Ps2, . . . ) to the optical system (Ot), by the method described in the first invention;

determining an optical path length aberration distribution $H(U, V)$ on an aberration defining virtual plane arbitrarily provided, based on an optical path length extending from a position of coordinates (U, V) on the aberration defining virtual plane to an ideal output image point conjugate to the input image point (Psj) and the broad sense phase distribution $\Psi sj(u, v)$; and evaluating the optical system (Ot) based on the optical path length aberration distribution $H(U, V)$.

Here, making a slight supplement to the suffix j in descriptions such as the above description "a broad sense phase distribution $\Psi sj(u, v)$ belonging to the input image point (Psj)", the suffix j denotes any one of the numbers assigned as suffixes to identify a portion related to each input image point with respect to the entire input image points (Ps1, Ps2, . . . ) and the entire broad sense phase distributions $\Psi s1(u, v)$, $\Psi s2(u, v)$, and . . . .

Namely, the input image point (Psj) and the broad sense phase distribution $\Psi sj(u, v)$ may be respectively the input image point (Ps1) and the broad sense phase distribution $\Psi s1(u, v)$ or the input image point (Ps2) and the broad sense phase distribution $\Psi s2(u, v)$.

Further, the expression "belonging" reflects the circumstance that the broad sense phase distribution $\Psi sj(u, v)$ is determined by determining the position of the input image point (Psj) and represents that the input image point (Psj) and the broad sense phase distribution $\Psi sj(u, v)$ are paired.

Here, the above-described broad sense phase will be additionally explained.

For example, when saying "phase distribution of light" on a certain plane, it is premised that the light electric field is coherent on the plane. If a coordinate system is provided on the plane, it means that such information that a phase of light wave motion at a point of a certain coordinate is delayed by π/2, for example, based on, for example, a phase of light wave motion at the origin of the coordinate system exists and is distributed at each coordinate point.

To realize such a situation, it is considered that when a point light source is a source, light wave motion emitted from the source extends to propagate through a lens and a reflector and thus to reach each point on the plane.

At this time, considering an optical path length of a path through which the light wave motion has propagated from the point light source to each coordinate point, it proves that a value of the optical path length is distributed on the plane.

In view of this, a difference in the value of the optical path length at each coordinate point based on the value of the optical path length at the origin of the coordinates of the plane, that is, distribution of an optical path length difference can be considered.

Distribution of a value obtained by multiplying a value of the optical path length difference, distributed on the plane as described above, by $k=2\pi/\lambda$, is the phase distribution of light. Here, $\lambda$ is a light wavelength in vacuum.

Accordingly, when distribution of a phase on a plane is measured using a holography technology, for example, a difference between either holding or calculating this distribution as distribution information of the phase, or holding or calculating the distribution as distribution information of an optical path length difference is not essential. As described above, since the phase and the optical path length difference can be always mutually converted by multiplying or dividing a value of wavenumber, they are considered to be equivalent information.

Thus, in this invention, information equivalent to the phase such as the optical path length difference is referred to as the broad sense phase.

However, in the following description, for ease of explanation, the broad sense phase is simply referred to as a phase except for the case where distinction is particularly needed.

Incidentally, like a laser, in the case of a light source which directly generates substantially parallel light beams without using a point light source as the source, an optical path length of a propagation path of light from an equiphase plane existing in a laser device may be considered, or when a virtual point light source is considered, the case where light from this light source is collimated by a lens to generate a beam may be alternatively considered; therefore, handling due to the optical path length is effective.

In a realistic image forming optical system, this invention can provide a technique of efficiently acquiring a phase distribution of light with respect to each input image point that is useful when the optical system is evaluated. In this technique, input image points located at prescribed input image spatial coordinates are simultaneously input to collectively obtain interference image data and evaluating the optical system, including a case where the optical system includes aberration as designed, error in profile of a refractive surface or a reflective surface of each image forming optical element, and defects such as eccentricity, surface distance error, and assembly error such as tilt.

BRIEF DESCRIPTION OF THE SEVERAL VIEWS OF THE DRAWINGS

FIGS. 6a to 6d are schematic diagrams of the concept associated with the technique of the optical system phase acquisition method of this invention.

DETAILED DESCRIPTION OF THE INVENTION

Figure 1:
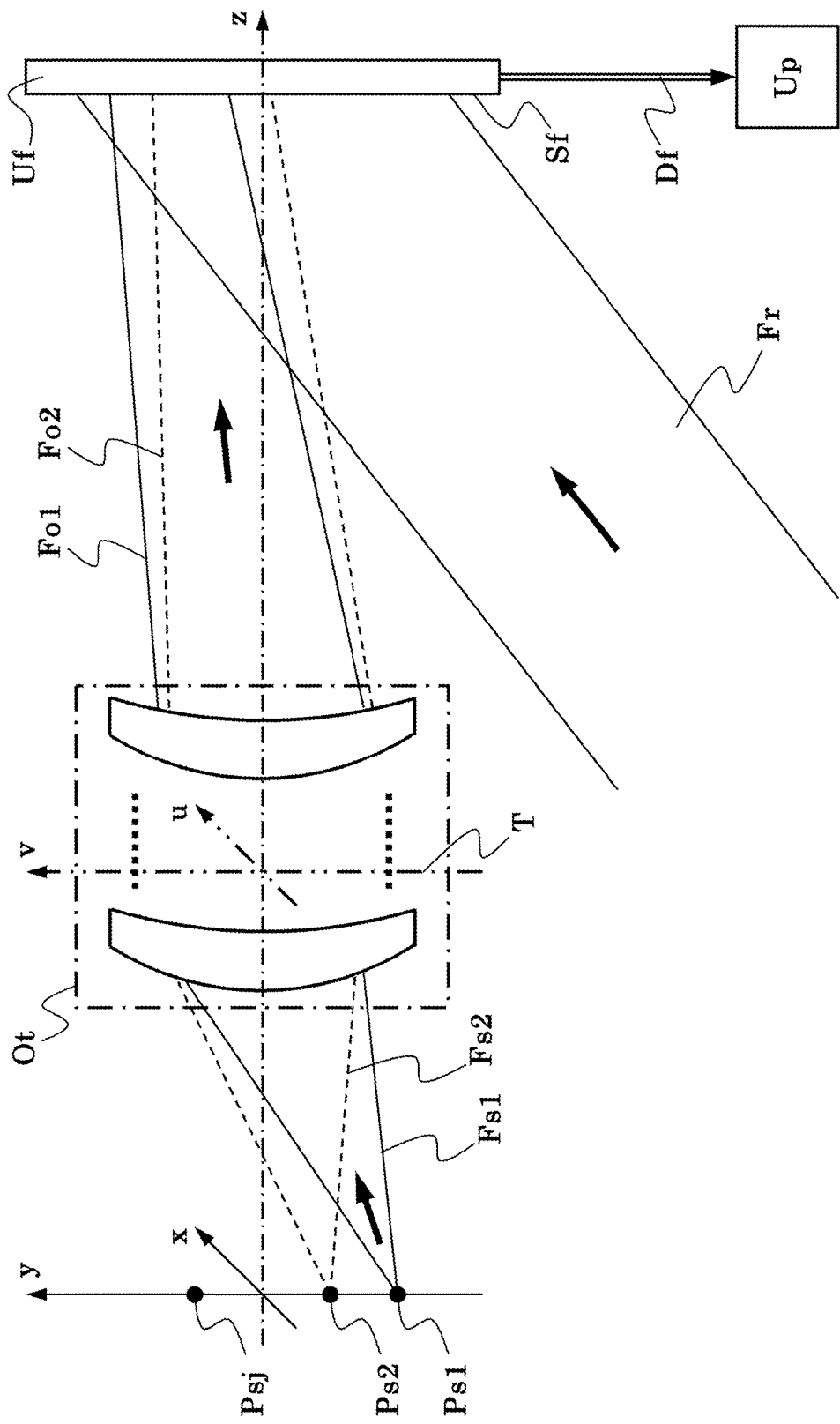
FIG. 1 is a block diagram of a configuration associated with a technique of an optical system phase acquisition method of the present invention.

In the description of this invention, image formation denotes a phenomenon in which with respect to an input image of a real image or a virtual image at finite distance or at infinity, an optical system generates an output image of the real image or the virtual image at finite distance or at infinity.

The term "conjugate", for example, when it is described as "A and B are conjugate to each other" as a general term in the field of geometric optics, means that an image of A is formed on B or an image of B is formed on A as a result of a function of an optical device, such as a lens, having an imaging function, at least on the basis of paraxial theory. In this case, A and B are images that obviously encompass an isolated point image as a target, and also encompass, as a target, a set of point images as well as an image having an extent in which point images are distributed in a continuous manner.

Here, as a general term in the field of geometric optics, "point image" or "image point" (i.e., "image") encompasses any of: a point that actually emits light therefrom; a point toward which light is converged and that causes a bright point to be shown on a screen when the screen is disposed thereat; a point toward which light is seen as if to be converged (but a screen is not allowed to be disposed thereat because the point is inside an optical system); and a point from which light is seen as if to be emitted (but a screen is not allowed to be disposed thereat because the point is inside an optical system). "Point image" or "image point" (i.e. "image") is used without distinguishing the above-mentioned points one from another.

Taking, as an example, a general camera lens in which an aperture stop typically exists inside the lens, an image of the aperture stop viewed through the lens when the lens is viewed from the light entering side is called an entrance pupil, an image of the aperture stop viewed through the lens when the lens is viewed from the light exiting side is called an exit pupil, and a ray (usually meridional ray) that travels toward the center of the entrance pupil or that travels out from the center of the exit pupil is called a principal ray.

Further, rays other than the principal ray are called marginal rays in a broad sense.

However, an optical system that uses light having directivity such as laser light has no necessity to extract a bundle of rays by the aperture stop, and may therefore have no aperture stop therein in many cases. In such a case, they are defined depending on an existence form of light in the optical system.

Typically, a central ray of directional distribution of light in a bundle of rays emitted from the emission point is considered the principal ray. The entrance pupil is considered to be located at a position where the principal ray entering the optical system or an extension thereof intersects the optical axis, and the exit pupil is considered to be located at a position where the principal ray exiting the optical system or an extension thereof intersects the optical axis.

However, in a precise sense, it is conceivable that the principal ray as defined above and the optical axis do not intersect each other, for example, as a result of adjustment error, and may only be skew in some cases.

However, such a phenomenon has no relation to the essence and is worthless to argue. In the description below, it is therefore assumed that such a phenomenon does not occur, or it is assumed that the principal ray and the optical axis intersect each other at a position where the principal ray and the optical axis are closest to each other.

Moreover, when paying attention to two adjacent partial optical systems A and B in the optical system where B is provided immediately downstream of A to be adjacent thereto, an exit pupil of A serves as an entrance pupil of B (in a manner similar to a manner in which an output image of A serves as an input image of B). Further, in the first place, all of the entrance pupils and the exit pupils of arbitrarily-defined partial optical systems in the optical system should be conjugate to one another (all of the entrance pupils and the exit pupils of the arbitrarily-defined partial optical systems are an image of the aperture stop where the aperture stop is provided, or are conjugate to one another even when no aperture stop is provided). For this reason, the entrance pupil and the exit pupil are simply referred to as "pupil" in the absence of the necessity to particularly distinguish one from the other.

Unless particularly contextually limited, the appellation of rays is considered to be used in a broad sense. For example, a ray coinciding with an optical axis is considered to be one type of meridional ray, and the meridional ray is considered to be one type of skew ray.

In the description of some embodiments of the invention and the drawings, the optical axis of the optical system is referred to as "z axis". However, in a case where the optical axis is bent by a reflector, a direction in which a ray that has been along the original z axis is reflected to travel is also referred to as "z axis", and no coordinate axis is newly provided therefor.

First, referring to FIG. 1 which is a block diagram of a configuration associated with a technique of an optical system phase acquisition method of the present invention, an embodiment for carrying out the optical system phase acquisition method will be described.

Positions of input image points (Ps1, Ps2, . . . ) to be actually input to an optical system (Ot) is assumed to be appropriately determined depending on purposes, such as for calculating OTF as evaluation of the optical system as described above.

When determining the positions, even if the optical system (Ot) as a target for phase acquisition is designed axisymmetrically, it is preferable to determine the positions such that image points are arranged with respect to all the four quadrants around the axis without assuming axisymmetry.

This is because phase distribution is affected by machining error and assembly error of a refractive surface or a reflective surface in the optical system (Ot).

In the drawings, although all the input image points (Ps1, Ps2, . . . ) are arranged on the y axis for ease of drawing, they may be arranged on a plane perpendicular to the z axis, such as an xy plane, or may be arranged three-dimensionally.

The input image points (Ps1, Ps2, . . . ) can be realized by a secondary light emitting point generated by applying a light flux from a primary coherence light source, such as a laser, to, for example, a mask plate having pin holes therethrough or a lens array in which lenses are arrayed two-dimensionally.

Then, illumination light fluxes (Fs1, Fs2, . . . ) from the input image points (Ps1, Ps2, . . . ) are input to the optical system (Ot) to generate output light fluxes (Fo1, Fo2, . . . ), and the output light flux (Fo1) is applied to an imaging surface (Sf) of an imaging element (Uf) including a CCD and a CMOS image sensor.

In this embodiment, an "object" in the holography technology corresponds to the optical system (Ot), "illumination light" corresponds to the illumination light fluxes (Fs1, Fs2, . . . ), and "object light" corresponds to the output light fluxes (Fo1, Fo2, . . . ).

In the drawings, the illumination light flux (Fs2) and the output light flux (Fo2) are shown by dashed lines so that they can be easily distinguished from the illumination light flux (Fs1) and the output light flux (Fo1).

A reference light flux (Fr) which is generated by, for example, dividing the light flux from the primary coherence light source and is coherent with the output light fluxes (Fo1, Fo2, . . . ) is applied to the imaging surface (Sf) so as to be superimposed with the output light fluxes (Fo1, Fo2, . . . ).

Consequently, since an interference image including interference fringes generated by interference between the output light fluxes (Fo1, Fo2, . . . ) and the reference light flux (Fr) is generated on the imaging surface (Sf), the interference image is imaged by the imaging element (Uf), and a processing apparatus (Up) receives and stores interference image data (Df) thus obtained.

Although the interference image data (Df) is an interference image on the imaging surface (Sf), that is, a multi-gradation bright and dark pattern of an interference fringe image, this can be converted into a phase distribution in the light electric field on the imaging surface (Sf). The conversion method is known as a Fourier-transform method (reference: Takeda, M., et al.: Fourier-transform method of fringe-pattern analysis for computer-based topography and interferometry, J. Opt. Soc. Am, Vol. 72, No. 1 (1982), pp. 156-160).

However, since the phase distribution acquired by this conversion method is a phase distribution associated with superimposed light electric fields formed on the imaging surface (Sf) by fluxes emitted from the input image points (Ps1, Ps2, . . . ), the phase distribution cannot be used for calculating OTF as it is. Thus, it is required that the phase distribution is separated into light electric fields formed by each of the independent input image points (Ps1, Ps2, . . . ) and then to obtain phase distributions $\Psi s1(u, v)$, $\Psi s2(u, v)$, and . . . on a phase defining plane (T).

Here, the phase defining plane (T) is a plane determining a phase when the phase is acquired in this invention, and the position, shape (plane, sphere, or the like), and so on (if the phase defining plane (T) has a plane shape, inclination to the optical axis is included, and if it has a sphere shape, the radius, the center position, and so on are included) can be arbitrarily determined according to the object of the phase acquisition.

However, usually an exit pupil of the optical system (Ot) which can be considered that the position and the shape are not affected by the position of the input image point and do not change is often adopted as the phase defining plane (T), and therefore, in the following description in this specification, the embodiment will be described, bearing in mind a case where the phase defining plane (T) is taken in the exit pupil of the optical system (Ot).

The separation into light electric fields formed by each of the independent input image points (Ps1, Ps2, . . . ) will be described with reference to FIG. 2 which is a schematic diagram of a concept associated with the technique of the optical system phase acquisition method of this invention.

Figure 2:
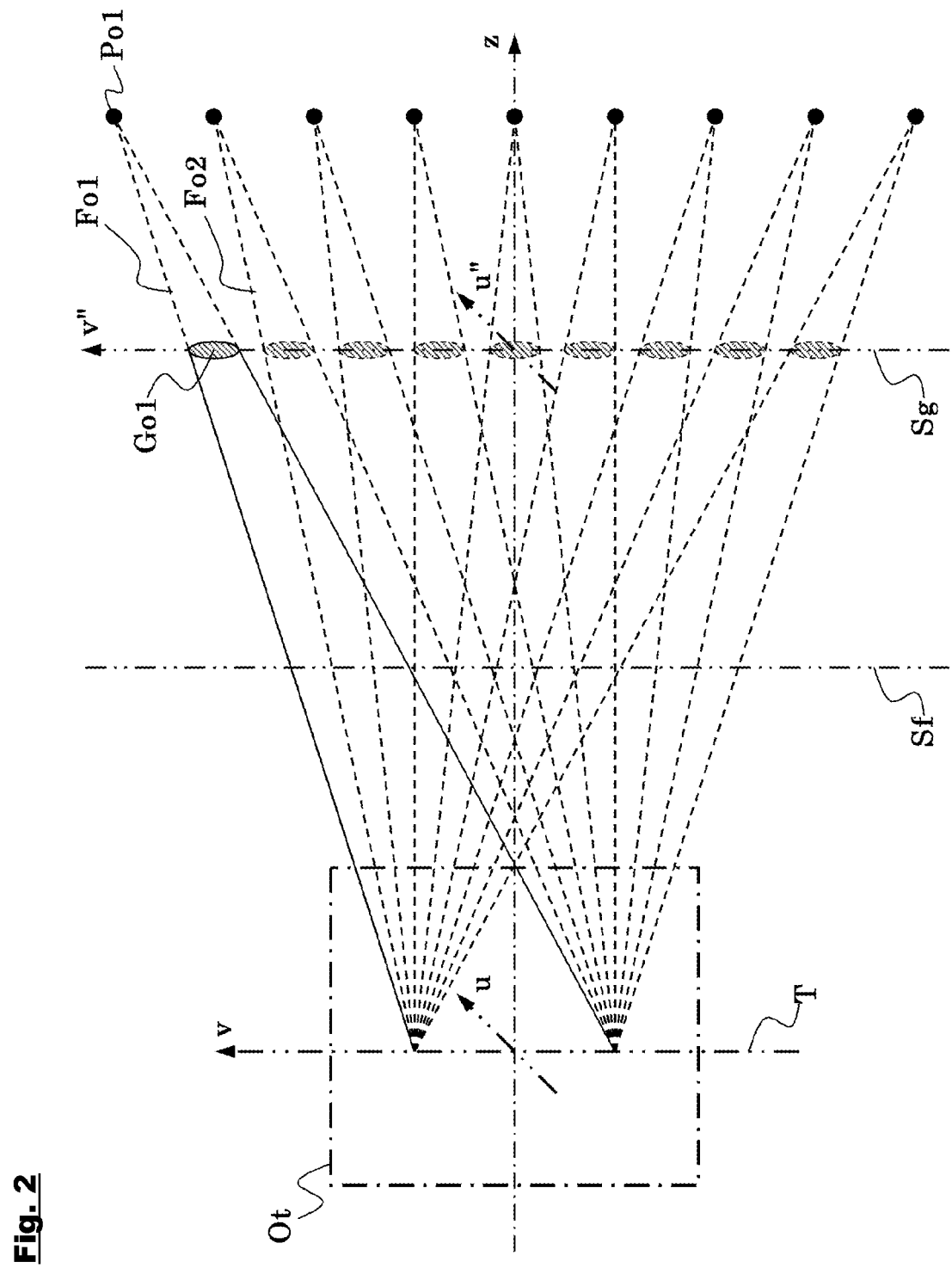
FIG. 2 is a schematic diagram of a concept associated with the technique of the optical system phase acquisition method of this invention.

When the optical system (Ot) as shown above in FIG. 1 forms a real image as an output image with respect to the input image points (Ps1, Ps2, . . . ), at a position traveled in the light traveling direction, as shown in FIG. 2, if diffractive optical light propagation simulation in which light is propagated in the light traveling direction by a satisfactory distance is performed, reconstructed output light fluxes (Fo1, Fo2, . . . ) should be separated. On the other hand, when the optical system (Ot) forms a virtual image as an output image, if diffractive optical light propagation simulation in which light is propagated in a direction opposite to the light traveling direction by a satisfactory distance is performed, reconstructed output light fluxes (Fo1, Fo2, . . . ) should be separated.

Thus, first, in the first stage, there is performed diffractive optical light propagation simulation in which, with a phase distribution determined by the Fourier-transform method as an initial state, light is propagated from the imaging surface (Sf) to a separation reconstruction surface (Sg) which is a plane which is away from the imaging surface (Sf) by a distance required for separation in a direction in which the output light fluxes (Fo1, Fo2, . . . ) to be reconstructed separate and is vertical to an optical axis, and a phase distribution $\Psi g1(u'', v'')$ of the light electric field in a light flux cross-section portion (Go1) on the separation reconstruction surface (Sg) of the reconstructed output light flux (Fo1) is calculated and acquired.

In the second stage, diffractive optical light propagation simulation in which light of the phase distribution $\Psi g1(u'', v'')$ on the separation reconstruction surface (Sg) is propagated to the phase defining plane (T) is performed, and the phase distribution $\Psi s1(u, v)$ is calculated.

Then, when the process comprising the two stages including the first and second stages is applied to each of the reconstructed output light fluxes (Fo1, Fo2, . . . ), the phase distributions $\Psi s1(u, v)$, $\Psi s2(u, v)$, and . . . can be separated and calculated.

Naturally, when the imaging surface (Sf) and the phase defining plane (T) coincide with each other, in the second stage, diffractive optical light propagation simulation in which light is returned to the imaging surface (Sf) as the phase defining plane (T) may be performed.

In the above description, there has been described that there is performed the diffractive optical light propagation simulation in which, with the phase distribution determined by the Fourier-transform method as an initial state, light is propagated from the imaging surface (Sf) to the separation reconstruction surface (Sg). However, as with the contents of the simulation as described above, there is performed diffractive optical light propagation simulation in which the reference light (Fr) subjected to amplitude modulation in an optical filter of a bright and dark pattern of the interference image data (Df) is propagated from the imaging surface (Sf) to the phase defining plane (T), and the phase distribution $\Psi g1(u'', v'')$ may be calculated.

Although the phase usually falls within a range of 0 to $2\pi$, if this range is compelled against a phase distributed on a plane, a portion where a phase value rapidly changes appears linearly even when the phase actually smoothly changes.

Since the phase represents a degree of relative delay/advance of a wave motion at a certain point with respect to a wave motion at a point determined as a reference, a rapid change in phase value is not essential.

Since the phase distribution of light wave motion on a plane is derived from the optical path length of a path of light having propagated from a point light source to the plane, it should be correct that a change that exceeds the range of 0 to $2\pi$ is allowed, and correction is performed to prevent the rapid change.

Such correction processing is called phase unwrapping. Since a change in phase distribution on the phase defining plane (T) is smooth, phase unwrapping correction processing can be relatively easily applied to the phase distribution $\Psi s1(u, v)$.

FIG. 1 will be briefly supplemented below. Although FIG. 1 illustrates that the output light flux (Fo1) and the reference light flux (Fr) are directly applied to the imaging element (Uf) from different directions to be superimposed, they are usually multiplexed by using a beam splitter to be often superimposed.

Although FIG. 1 further illustrates that the illumination light flux (Fs1) and the reference light flux (Fr) are independent, since they should be coherent, they are usually generated from a common light source.

The reference light flux (Fr) may be generated by applying a spatial frequency filter which removes components other than a spatial DC component to the illumination light flux.

The processing apparatus (Up) can be realized by a computer including an interface and a CPU configured to receive the interference image data (Df) from the imaging element (Uf), a nonvolatile memory which stores the interference image data (Df), OS, and processing programs required for calculation, and the volative memory which is loaded with the OS and the processing programs required for calculation and stores data required for execution of processing and calculation. The processing apparatus (Up) can read out the stored interference image data (Df) and execute calculation based on the digital holographic imaging technology.

The calculation contents in the digital holographic imaging are as described as the contents of simulation as described above.

Here, a specific configuration for achieving acquisition of the interference image data (Df) collectively including information of interference images about the input image points (Ps1, Ps2, . . . ), as described above will be described with reference to FIG. 3 which is a schematic diagram of the configuration associated with the technique of the optical system phase acquisition method of this invention.

A light source beam (As) from a primary coherence light source (Us) such as a helium-neon laser is divided into a beam (Ai) for generating an illumination light flux and a beam (Ar) for generating a reference light flux by a beam splitter (BS1) for beam division.

A reference light flux generating unit is constituted of a mirror (Mr) and a beam expander (BEr). The beam (Ar) for generating a reference light flux is reflected by the mirror (Mr) and then input to the beam expander (BEr) constituted of a condenser lens (Lrf) and a collimator lens (Lrc), and a reference light flux (Fr) is generated as a parallel light flux in which a beam is enlarged to have a necessary thickness.

If a pin hole opening (Ua) is installed so as to coincide with a light-collecting point of the condenser lens (Lrf), the beam expander (BEr) can provide a function of a spatial frequency filter which removes components other than a spatial DC component, whereby optical noise caused by dust and the like adhered to a surface of an optical element present in an optical path extending to the pin hole opening (Ua) is removed, so that the reference light flux (Fr) can be cleaned up.

On the other hand, an illumination light flux generating unit is constituted of a mirror (Mi) and a beam expander (BEi). The beam (Ai) for generating an illumination light flux is reflected by the mirror (Mi) and then input to the beam expander (BEi) constituted of a condenser lens (Lif) and a collimator lens (Lic), and a primary illumination light flux (Fi) is generated as a parallel light flux in which a beam is enlarged to have a necessary thickness.

A pin hole opening similar to the pin hole opening (Ua) may be installed with respect to the beam expander (BEi), but it is omitted in this drawing.

The illumination light flux generating unit further includes a lens array (Lm) and a mask plate (Pm) and, if necessary, includes a light flux conversion optical system (Oc).

The primary illumination light flux (Fi) enters the lens array (Lm) and forms light-collecting regions at a focusing portion of each lens of the lens array (Lm).

Pin holes are opened in the mask plate (Pm), and the lens array (Lm) and the mask plate (Pm) are combined such that a region centering on each of the pin holes is illuminated by the light-collecting region formed by the lens array (Lm).

The pin holes of the mask plate (Pm) each form an input image point set, and since light fluxes from them are telecentric, the light flux conversion optical system (Oc) is provided if necessary. Matching is performed such that each main ray travels toward an entrance pupil of the optical system (Ot) as a target of acquisition of a phase, and the rays as illumination light fluxes (Fs1, Fs2, . . . ) of each of them collectively enter the optical system (Ot).

Accordingly, virtual images formed by forming an image of each of the pin holes of the mask plate (Pm) by the light flux conversion optical system (Oc) become the input image points (Ps1, Ps2, . . . ).

The output light fluxes (Fo1, Fo2, . . . ) generated by the optical system (Ot) by receiving the illumination light fluxes (Fs1, Fs2, . . . ) are reflected by a beam splitter (BS2) and applied to the imaging surface (Sf) of the imaging element (Uf).

Here, it is assumed that an angle of the beam splitter (BS2) is adjusted such that the optical axis of the optical system (Ot) is vertical to the imaging surface (Sf).

The reference light flux (Fr) is transmitted through the beam splitter (BS2) and similarly applied to an imaging surface of the imaging element (Uf) while being superimposed with the output light fluxes (Fo1, Fo2, . . . ), and an interference image is formed on the imaging surface of the imaging element (Uf) and imaged. Thus, the interference image data (Df) collectively including information of interference images about the input image points (Ps1, Ps2, . . . ) can be acquired.

However, in this drawing, it is assumed that there is provided a so-called off-axis type in which an optical axis of the reference light flux (Fr) is set to incline with respect to the imaging surface of the imaging element (Uf) without being vertical thereto so as not to be coaxial with the optical axes of the output light fluxes (Fo1, Fo2, . . . ).

Corresponding to the fact that +1st, 0th, and −1st order diffraction light are generated from a sinusoidal concentration diffraction grating, in holography (including digital holographic imaging), also in a reconstructed image, three kinds of normal images including a +1st-order image, a 0th-order image (transmitted light), and −1st-order image (conjugate image) are generated.

When the off-axis type is not provided (in a case of an inline type), light fluxes forming those three kinds of images are all output in the same direction, so that cumbersome noise is superimposed with the normal images.

The objective of providing the off-axis type is to thereby separate the directions of the light fluxes forming those three kinds of images and avoid the problem that cumbersome noise is superimposed with the normal images.

However, if the off-axis type is adopted, since an interference fringe of an interference image becomes thin, as the imaging element (Uf), an imaging element in which the pixel size is fine and the number of pixels is large is required to be used, and thus the off-axis type has such a drawback that the load of the computing process increases.

In order to avoid this problem, it is necessary to adopt the inline type and then avoid the problem that cumbersome noise is superimposed with the normal images. In this respect, many kinds of proposals have been tried.

For example, there is a method of imaging the interference images in which the phase of the reference light flux (Fr) is shifted and reconstructing an image by calculation using the data thereof. (Reference: OPTICS LETTERS, Vol. 22, No. 16, Aug. 15, 1997, pp 1268-1270, Yamaguchi I. et al: "Phase-shifting digital holography")

Also in the present optical system phase acquisition method, the above method can be applied, and in order to shift the phase of the reference light flux (Fr), the mirror (Mr) is modified such that the mirror (Mr) is movable by using a fine-movement mechanism according to a piezo element and so on, for example, whereby the above method can be applied.

Although the size of the optical system (Ot) as a target of acquisition of a phase, that is, the thickness of a cross section vertical to an optical axis of each of the output light fluxes (Fo1, Fo2, . . . ) or a space occupied by the entirety of the output light fluxes (Fo1, Fo2, . . . ) differs from one to another, the dimension of the imaging surface (Sf) of the imaging element (Uf) which is available is limited.

Accordingly, in some cases, the dimension of the imaging surface (Sf) may be insufficient with respect to a necessary size, and particularly when the interference image data (Df) collectively including information of interference images about the input image points (Ps1, Ps2, . . . ) is acquired, such a circumstance is likely to occur.

Avoidance of this problem will be described with reference to FIG. 4 which is a schematic diagram of the configuration associated with the technique of the optical system phase acquisition method of this invention.

Figure 3:
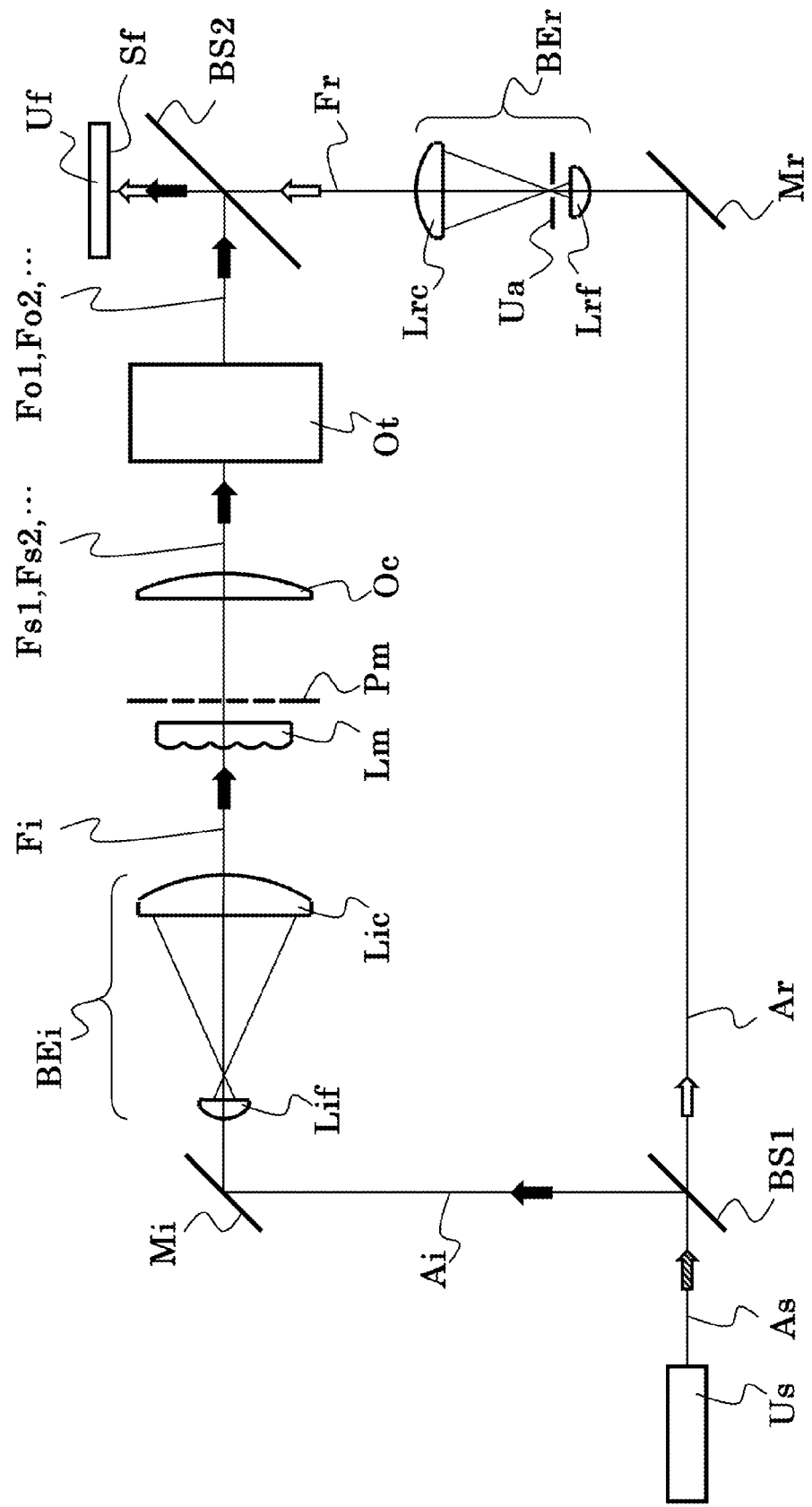
FIG. 3 is a schematic diagram of the configuration associated with the technique of the optical system phase acquisition method of this invention.

In the configuration of this drawing, with respect to the configuration described in FIG. 3, a relay optical system (Oq) exhibiting an action of reducing the thickness of a light flux group constituted of the entirety of the illumination light fluxes (Fs1, Fs2, . . . ) is inserted in the post stage of the optical system (Ot), that is, between the optical system (Ot) and the imaging element (Uf).

The output light fluxes (Fo1, Fo2, . . . ) generated by the optical system (Ot) by receiving the illumination light fluxes (Fs1, Fs2, . . . ) enter the relay optical system (Oq) disposed coaxially with the optical axis of the optical system (Ot), and relay output light fluxes (Fq1, Fq2, . . . ) are collectively output from the relay optical system (Oq).

The relay output light fluxes (Fq1, Fq2, . . . ) are reflected by the beam splitter (BS2) to be applied onto the imaging surface (Sf) of the imaging element (Uf) without exceeding the dimension, and thus to be superimposed with the reference light flux (Fr) transmitted through the beam splitter (BS2), whereby an interference image is imaged.

Since the configuration of the relay optical system (Oq) is required to be determined according to the configuration of the optical system (Ot), how to achieve the configuration of the relay optical system (Oq) cannot be unqualifiedly mentioned; however, usually, it is preferable to design such that a reduced image conjugate to the exit pupil of the optical system (Ot) is formed on the imaging surface (SD).

However, since the beam splitter (BS2) is required to be present between the relay optical system (Oq) and the imaging surface (Sf), the relay optical system (Oq) should be designed as a retrofocus optical system, and in this case, the relay optical system (Oq) is required to be realized by a combined lens constituted of a plurality of lenses.

There will be described the method of acquiring the phase distributions $\Psi s1(u, v)$, $\Psi s2(u, v)$, and . . . , belonging to each of the input image points (Ps1, Ps2, . . . ) on the phase defining plane (T) of the optical system (Ot), from the interference image data (Df) acquired through the relay optical system (Oq) and collectively including information of interference images about the input image points (Ps1, Ps2, . . . ).

Hereinabove, there has been described that, when the phase distributions $\Psi s1(u, v)$, $\Psi s2(u, v)$, and . . . belonging to each of the input image points (Ps1, Ps2, . . . ) on the phase defining plane (T) of the optical system (Ot) are acquired from the interference image data (Df) acquired not through the relay optical system (Oq) and collectively including information of interference images about the input image points (Ps1, Ps2, . . . ), there is performed diffractive optical light propagation simulation in which light is propagated from the imaging surface (Sf) to the separation reconstruction surface (Sg) which is a plane which is away from the imaging surface (Sf) by a distance required for separation in the direction in which the output light fluxes (Fo1, Fo2, . . . ) to be reconstructed separate and is vertical to the optical axis, and the phase distribution $\Psi g1(u'', v'')$ of the light electric field in the light flux cross-section portion (Go1) on the separation reconstruction surface (Sg) of the reconstructed output light flux (Fo1) is calculated.

Also in the above case where the interference image data (Df) is acquired through the relay optical system (Oq), since a plane vertical to an optical axis at a suitable position where light fluxes to be reconstructed are observed separately, that is, a separation reconstruction surface exists, paying an attention to a certain light flux (set to be a j-th light flux), if phase distribution of the light flux on the separation reconstruction surface is calculated, a direction of a ray at an arbitrary point on the separation reconstruction surface can be determined.

Accordingly, ray tracing simulation in which light travels in a direction opposite to an original light traveling direction is performed based on design data of the relay optical system (Oq) until the light travels from the separation reconstruction surface in an output image space of the relay optical system (Oq) to the phase defining plane (T) of the optical system (Ot) in an input image space of the relay optical system (Oq), whereby the coordinates (u, v) at an arrival point on the phase defining plane (T) can be determined, and, at the same time, the phase distribution $\Psi sj(u, v)$ at an arrival point on the phase defining plane (T) can be determined by subtracting a phase, obtained by multiplying an optical path length from the separation reconstruction surface to the phase defining plane (T) by a wavenumber, from a phase on the separation reconstruction surface. Thus, the phase distribution on the phase defining plane (T) can be acquired.

The phase distributions $\Psi s1(u, v)$, $\Psi s2(u, v)$, and . . . can be acquired by applying this operation to all light fluxes observed separately by reconstruction.

As is easily seen from the description above, since the ray tracing simulation is performed back through light propagation in the relay optical system (Oq), the relay optical system (Oq) may have aberration as designed.

However, if a lens included in the relay optical system (Oq) has defects such as an error in a curvature radius of a refractive surface and surface sag, or if there are eccentricity and an error in a distance between lenses, since an error occurs in phase distribution to be acquired, careful processing is required.

In an optical system, when, in addition to aberration as designed, there are error in profile of a refractive surface or a reflective surface of each image forming optical element and defects such as eccentricity, surface distance error, and assembly error such as tilt, in evaluating how the performance is affected thereby, for example, in order to inspect how much the optical system can decompose fine image information to input (read) or output (write) the information, a resolution test chart in which a pattern according to a metallized film is formed on a glass substrate by applying a lithography technique is sometimes used. However, in some cases, a numerical value which is an index of a performance associated with the resolution needs to be calculated to perform quantitative evaluation.

For example, in a case of an electrical circuit amplifier, in order to examine how gain of an output signal or a phase delay changes as a frequency of an input signal of a sine wave increases, a transfer function based on Fourier transform calculation is evaluated.

In a case of an image forming optical system, in order to examine how a contrast of an output image and a phase shift change as a spatial frequency of an input image increases, an optical transfer function similarly based on Fourier transform calculation, that is, OTF (reference: M. Born, E. Wolf (translated by Toru KUSAKAWA and Hideshi YOKOTA): Principles of Optics II, published by the Tokai University, Dec. 20, 1980, fourth issue, 9.5) is evaluated.

However, in the case of the electrical circuit amplifier, unless waveform distortion due to nonlinear response is considered, monotonous repetition of a sinusoidal waveform just continues. Thus, although there is only one transfer function, in a case of an optical system, the resolution changes depending on a place of a screen, and therefore, it is different in that OTF is required to be calculated for each place when a plurality of places desired to be evaluated are present on a screen.

Hereinafter, a calculation method for OTF evaluation in an optical system to which the optical system phase acquisition method of this invention, which is one of optical system evaluation methods, is applied will be described.

Figure 4:
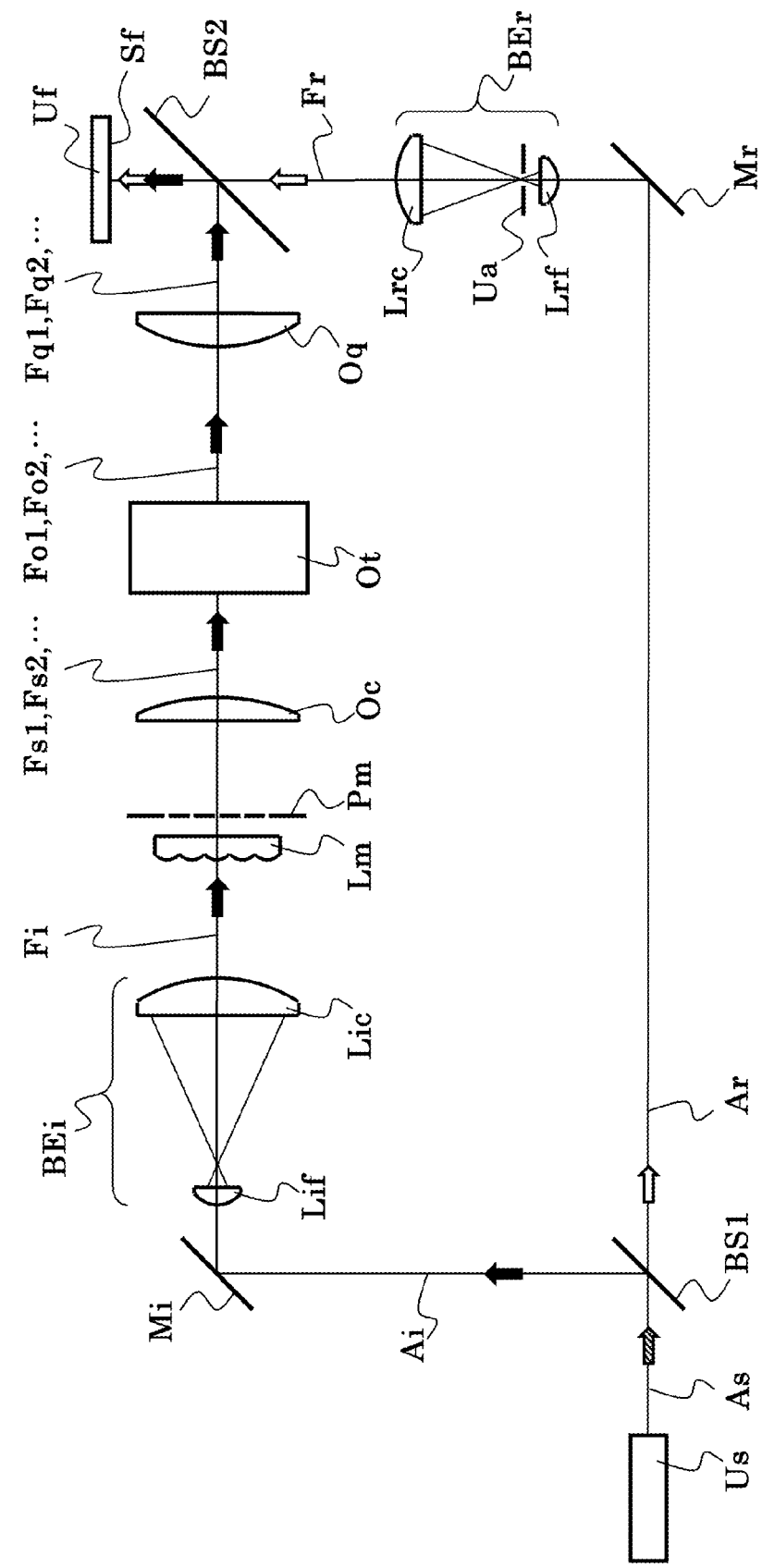
FIG. 4 is a schematic diagram of the configuration associated with the technique of the optical system phase acquisition method of this invention.

If the places on the screen which are desired to be evaluated are determined, for example, the above optical system of FIG. 3 or 4 constituted of the lens array (Lm) and the mask plate (Pm) or the light flux conversion optical system (Oc) instead of the lens array (Lm) and the mask plate (Pm) realizes the input image points (Ps1, Ps2, . . . ) exist respectively at portions corresponding to the places on the screen which are desired to be evaluated to input the input image points to the optical system (Ot) to be evaluated, and thus to acquire the phase distributions $\Psi s1(u, v)$, $\Psi s2(u,$ v), and . . . belonging to each of the input image points (Ps1, Ps2, . . . ) on the phase defining plane (T).

Hereinafter, as described above, the suffix j denotes any one of the numbers assigned as suffixes to identify a portion related to each input image point with respect to the entire input image points (Ps1, Ps2, . . . ), and a case where OTF near the input image point (Psj) is evaluated will be described.

In order to acquire OTF, an optical path length aberration distribution is required to be obtained based on a phase distribution.

Figure 5:
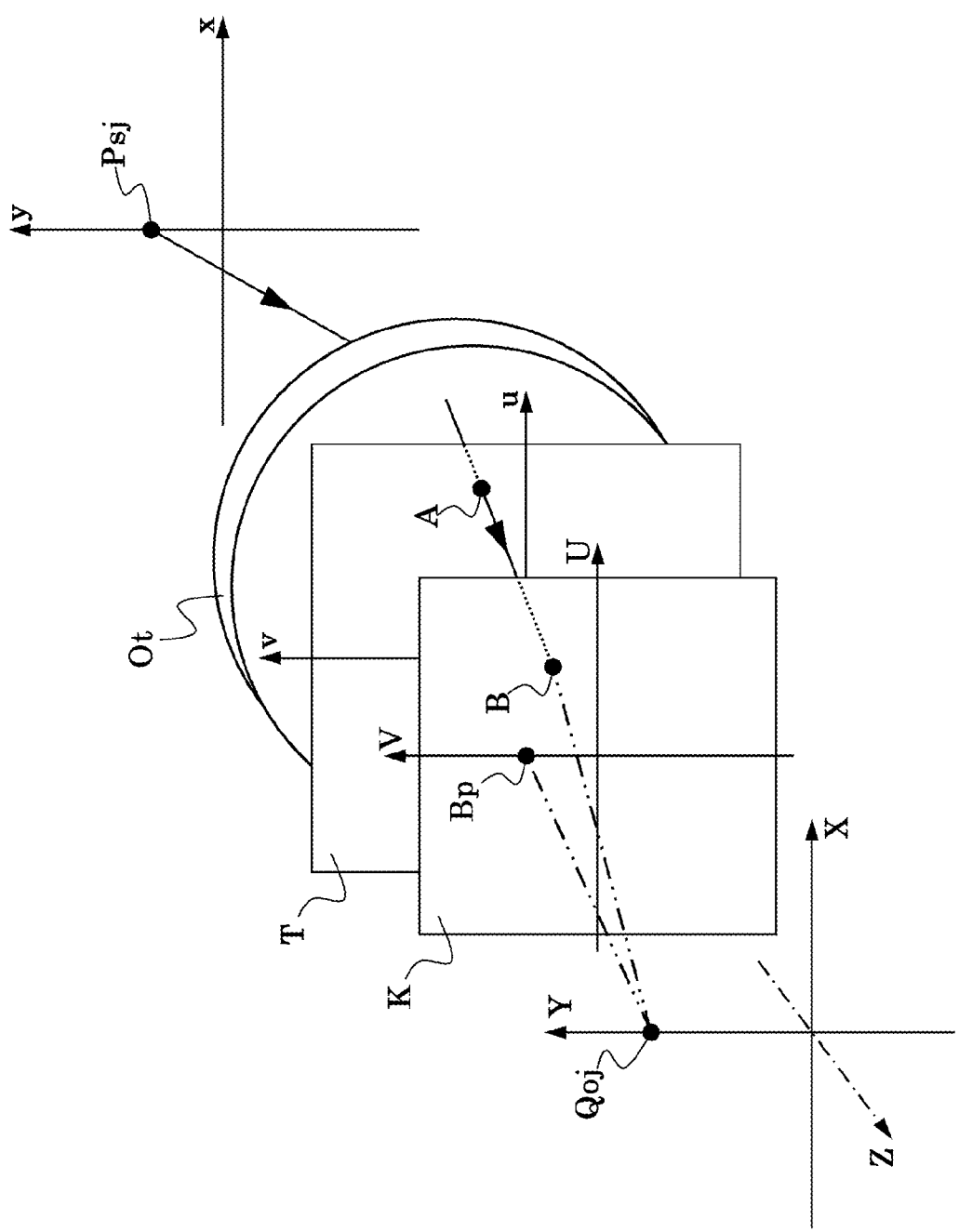
FIG. 5 is a schematic diagram of the concept associated with the technique of the optical system phase acquisition method of this invention.

Here, as shown in FIG. 5 which is a schematic diagram of a concept associated with the technique of the optical system phase acquisition method of this invention, with respect to a sum $\Gamma(U, V)+\Gamma_o(U, V)$ of an optical path length $\Gamma(U, V)$ extending to a point (B) at coordinates (U, V) in which a ray emitted from an input image point (Psj) passes through the optical system (0o to reach an aberration defining virtual plane (K) arbitrarily provided and thus to intersect and a virtual optical path length $\Gamma_o(U, V)$ of a virtual ray, which extends from the point (B) to an ideal output image point (Qoj) conjugate to the input image point (Psj), an optical path length aberration H(U, V) is defined by a difference from that of a main ray, that is, the following formula (1):

$$H(U,V)=\Gamma(U,V)+\Gamma_o(U,V)-(\Gamma_p+\Gamma_{op}).$$

$\Gamma_p$ is an optical path length extending to a point (Bp) in which a main ray emitted from the input image point (Psj) reaches the aberration defining virtual plane (K) and thus to intersect. $\Gamma_{op}$ is a virtual optical path length of a virtual main ray from the point (Bp) to the ideal output image point (Qoj).

The term "ideal" of the ideal output image point (Qoj) means that the position is predicted by an aplanatic paraxial theory.

In FIG. 5, for facilitating understanding of a main ray, the input image point (Psj) and the ideal output image point (Qoj) are illustrated so as to be located on y and Y axes. However, this invention is not limited thereto in actual application.

Although FIG. 6 illustrates a case where the aberration defining virtual plane (K) is a plane vertical to an optical axis located more backward than the phase defining plane (T), the aberration defining virtual plane (K) may be the same as the phase defining plane (T) or may be a plane vertical to the virtual main ray or a spherical surface centered on the ideal output image point (Qoj). Particularly, in this case, the optical path length aberration is referred to as wavefront aberration.

When the aberration defining virtual plane (K) is set to be the same as the phase defining plane (T), the optical path length $\Gamma(U, V)$ can be directly obtained from the phase distribution $\Psi sj(u, v)$ on the phase defining plane (T) by dividing it by wavenumber, as described above.

However, when the aberration defining virtual plane (K) is not the same as the phase defining plane (T), as described above, a phase distribution on the aberration defining virtual plane (K) is temporarily acquired by diffractive optical light propagation simulation from the phase defining plane (T) to the aberration defining virtual plane (K), and the optical path length $\Gamma(U, V)$ may be obtained.

Hereinafter, for ease of handling, the aberration defining virtual plane (K) is set to be the same as the phase defining plane (T), and, as described above, the case where the phase defining plane (T) is taken with respect to an exit pupil of the optical system (Ot) will be described.

A pupil function represented by the following formula (2) including the optical path length aberration distribution H(U, V) is defined:

$$G(U,V)=E(U,V)\exp\{-2\pi i H(U,V)/\lambda\}.$$

Here, E(U, V) is a function whose value is 0 at a position corresponding to outside of the exit pupil. When an illumination distribution or transmittance distribution is present in a pupil, if distribution of amplitude, a phase filter, or the like is present, E(U, V) can include it as a function having a distribution of phase shift. i is an imaginary unit.

In the input image spatial coordinates, if an input image on a plane in which the z coordinates are constant is considered, and accordingly, if an output image on a plane conjugate to the relevant plane is considered, while the spatial frequency in the X direction on an output image plane X, Y is written as m, the spatial frequency in the Y direction is written as n. In this case, OTF is represented as a function of m and n.

When an input image set is coherent, OTF can be calculated by the following formula (3):

$$OTF(m,n)=G(\lambda Lm+X,\lambda Ln+Y).$$

L represents a length of a path extending from the point (Bp) to the ideal output image point (Qoj) and extending along a virtual main ray.

When the input image set is noncoherent, OTF can be calculated by autocorrelation integration of the following formula (4):

$$OTF(m,n)=\iint G(\lambda L(m+m'),\lambda L(n+n'))\cdot \overline{G}(\lambda Lm',\lambda Ln')\,dm'dn'.$$

However, an integration region is from $-\infty$ to $+\infty$, and the mark $\overline{\phantom{x}}$ represents a complex conjugate.

In an optical system, when there are the aberration and the defects, as the degree deteriorates, OTF is rapidly reduced with respect to an increase in a spatial frequency m, n. Therefore, this invention can be applied to evaluation of the optical system (Ot).

The influence of the aberration and the defects on the performance of the optical system becomes larger as it approaches a periphery of a screen, and therefore, it is preferable that the input image points (Ps1, Ps2, . . . ) are set at positions around the optical axis, which correspond to a maximum field angle according to specifications, and OTF with respect to each position is evaluated.

Hereinabove, although the case where OTF is obtained and evaluated has been described as an example in which the optical system (Ot) is evaluated based on the optical path length aberration distribution H(U, V), the optical path length aberration distribution H(U, V) related to the input image point (Psj) obtained by the formula (1) is subjected to Zernike polynomial expanding (reference: M. Born, E. Wolf (translated by Toru KUSAKAWA and Hideshi YOKOTA): Principles of Optics II, published by the Tokai University, Dec. 20, 1980, fourth issue, 9.2.1, Appendix VII), and the optical system (Ot) may be evaluated by the magnitude of the expanding coefficient.

Zernike polynomials are defined inside a unit circle, that is, a circle whose radius is 1, and when coordinates $(\alpha, \beta)$ there are represented by polar coordinates $(\rho, \theta)$ connected by the following formula (5):

$$\alpha=\rho\cos\theta$$

$$\beta=\rho\sin\theta,$$

an optical path length aberration $H(\rho, \theta)$ is represented by a sum of values obtained by multiplying a Zernike polynomial Znm($\rho$, $\theta$) which is the expanding coefficient by a Zernike expanding coefficient Anm which is the expanding coefficient, as shown in FIG. 6a which is a schematic diagram of a concept associated with the technique of the optical system phase acquisition method of this invention, when the Zernike polynomials are used.

The Zernike polynomial Znm($\rho$, $\theta$) is represented by a product of a radial function Rnm($\rho$) and an argument function fm($\theta$), as shown in FIG. 6b. Here, the radial function Rnm($\rho$) is determined by the method shown in FIG. 6c, and the argument function fm($\theta$) is as shown in FIG. 6d.

However, as described in FIG. 6a, a main order n handles numbers from 0 to a suitably determined upper limit N, and only auxiliary orders m whose difference from the main order n is even are handled.

In the calculation shown in FIG. 6c, in some cases, a value of (n+m)/2−s becomes a negative integer. Although the factorial of the value cannot be calculated, when a reciprocal form of J!=J·(J−1)! as a generally exhibited property associated with the factorial, 1/(J−1)!=J/J! is applied to a sequence J=0, −1, −2, and . . . , since it can be interpreted in an extended manner that the reciprocal of the factorial of a negative integer is 0, a coefficient of the power term of $\rho$ with respect to s in a condition where the value of (n+m)/2−s becomes negative is set to be 0.

A specific form of the Zernike polynomial Znm($\rho$, $\theta$) in a range n=0, 1, . . . , and 10 of the main order n is as represented by the following formula (6).

| k | n | m | Znm($\rho$, $\theta$) |
|---|---|---|---|
| 1 | 0 | 0 | +1 |
| 2 | 1 | 1 | +$\rho$ · cos$\theta$ |
| 3 | 1 | −1 | +$\rho$ · sin$\theta$ |
| 4 | 2 | 2 | +$\rho^2$ · cos2$\theta$ |
| 5 | 2 | 0 | +2$\rho^2$ −1 |
| 6 | 2 | −2 | +$\rho^2$ · sin2$\theta$ |
| 7 | 3 | 3 | +$\rho^3$ · cos3$\theta$ |
| 8 | 3 | 1 | {+3$\rho^3$ −2$\rho$} cos$\theta$ |
| 9 | 3 | −1 | {+3$\rho^3$ −2$\rho$} sin$\theta$ |
| 10 | 3 | −3 | +$\rho^3$ · sin3$\theta$ |
| 11 | 4 | 4 | +$\rho^4$ · cos4$\theta$ |
| 12 | 4 | 2 | {+4$\rho^4$ −3$\rho^2$} cos2$\theta$ |
| 13 | 4 | 0 | +6$\rho^4$ −6$\rho^2$ +1 |
| 14 | 4 | −2 | {+4$\rho^4$ −3$\rho^2$} sin2$\theta$ |
| 15 | 4 | −4 | +$\rho^4$ · sin4$\theta$ |
| 16 | 5 | 5 | +$\rho^5$ · cos5$\theta$ |
| 17 | 5 | 3 | {+5$\rho^5$ −4$\rho^3$} cos3$\theta$ |
| 18 | 5 | 1 | {+10$\rho^5$ −12$\rho^3$ +3$\rho$} cos$\theta$ |
| 19 | 5 | −1 | {+10$\rho^5$ −12$\rho^3$ +3$\rho$} sin$\theta$ |
| 20 | 5 | −3 | {+5$\rho^5$ −4$\rho^3$} sin3$\theta$ |
| 21 | 5 | −5 | +$\rho^5$ · sin5$\theta$ |
| 22 | 6 | 6 | +$\rho^6$ · cos6$\theta$ |
| 23 | 6 | 4 | {+6$\rho^6$ −5$\rho^4$} cos4$\theta$ |
| 24 | 6 | 2 | {+15$\rho^6$ −20$\rho^4$ +6$\rho^2$} cos2$\theta$ |
| 25 | 6 | 0 | +20$\rho^6$ −30$\rho^4$ +12$\rho^2$ −1 |
| 26 | 6 | −2 | {+15$\rho^6$ −20$\rho^4$ +6$\rho^2$} sin2$\theta$ |
| 27 | 6 | −4 | {+6$\rho^6$ −5$\rho^4$} sin4$\theta$ |
| 28 | 6 | −6 | +$\rho^6$ · sin4$\theta$ |
| 29 | 7 | 7 | +$\rho^7$ · cos7$\theta$ |
| 30 | 7 | 5 | {+7$\rho^7$ −6$\rho^5$} cos5$\theta$ |
| 31 | 7 | 3 | {+21$\rho^7$ −30$\rho^5$ +10$\rho^3$} cos3$\theta$ |
| 32 | 7 | 1 | {+35$\rho^7$ −60$\rho^5$ +30$\rho^3$ −4$\rho$} cos$\theta$ |
| 33 | 7 | −1 | {+35$\rho^7$ −60$\rho^5$ +30$\rho^3$ −4$\rho$} sin$\theta$ |
| 34 | 7 | −3 | {+21$\rho^7$ −30$\rho^5$ +10$\rho^3$} sin3$\theta$ |
| 35 | 7 | −5 | {+7$\rho^7$ −6$\rho^5$} sin5$\theta$ |
| 36 | 7 | −7 | +$\rho^7$ · sin7$\theta$ |
| 37 | 8 | 8 | +$\rho^8$ · cos8$\theta$ |
| 38 | 8 | 6 | {+8$\rho^8$ −7$\rho^6$} cos6$\theta$ |
| 39 | 8 | 4 | {+28$\rho^8$ −42$\rho^6$ +15$\rho^4$} cos4$\theta$ |
| 40 | 8 | 2 | {+56$\rho^8$ −105$\rho^6$ +60$\rho^4$ −10$\rho^2$} cos2$\theta$ |
| 41 | 8 | 0 | +70$\rho^8$ −140$\rho^6$ +90$\rho^4$ −20$\rho^2$ +1 |
| 42 | 8 | −2 | {+56$\rho^8$ −105$\rho^6$ +60$\rho^4$ −10$\rho^2$} sin2$\theta$ |
| 43 | 8 | −4 | {+28$\rho^8$ −42$\rho^6$ +15$\rho^4$} sin4$\theta$ |
| 44 | 8 | −6 | {+8$\rho^8$ −7$\rho^6$} sin4$\theta$ |
| 45 | 8 | −8 | +$\rho^8$ · sin8$\theta$ |
| 46 | 9 | 9 | +$\rho^9$ · cos9$\theta$ |
| 47 | 9 | 7 | {+9$\rho^9$ −8$\rho^7$} cos7$\theta$ |
| 48 | 9 | 5 | {+36$\rho^9$ −56$\rho^7$ +21$\rho^5$} cos5$\theta$ |
| 49 | 9 | 3 | {+84$\rho^9$ −168$\rho^7$ +105$\rho^5$ −20$\rho^3$} cos3$\theta$ |
| 50 | 9 | 1 | {+126$\rho^9$ −280$\rho^7$ +210$\rho^5$ −60$\rho^3$ +5$\rho$} cos$\theta$ |
| 51 | 9 | −1 | {+126$\rho^9$ −280$\rho^7$ +210$\rho^5$ −60$\rho^3$ +5$\rho$} sin$\theta$ |
| 52 | 9 | −3 | {+84$\rho^9$ −168$\rho^7$ +105$\rho^5$ −20$\rho^3$} sin3$\theta$ |
| 53 | 9 | −5 | {+36$\rho^9$ −56$\rho^7$ +21$\rho^5$} sin5$\theta$ |
| 54 | 9 | −7 | {+9$\rho^9$ −8$\rho^7$} sin7$\theta$ |
| 55 | 9 | −9 | +$\rho^9$ · sin9$\theta$ |
| 56 | 10 | 10 | +$\rho^{10}$ · cos10$\theta$ |
| 57 | 10 | 8 | {+10$\rho^{10}$ −9$\rho^8$} cos8$\theta$ |
| 58 | 10 | 6 | {+45$\rho^{10}$ −72$\rho^8$ +28$\rho^6$} cos6$\theta$ |
| 59 | 10 | 4 | {+120$\rho^{10}$ −252$\rho^8$ +168$\rho^6$ −35$\rho^4$} cos4$\theta$ |
| 60 | 10 | 2 | {+210$\rho^{10}$ −504$\rho^8$ +420$\rho^6$ −140$\rho^4$ +15$\rho^2$} cos2$\theta$ |
| 61 | 10 | 0 | +252$\rho^{10}$ −630$\rho^8$ +560$\rho^6$ −210$\rho^4$ +30$\rho^2$ −1 |
| 62 | 10 | −2 | {+210$\rho^{10}$ −504$\rho^8$ +420$\rho^6$ −140$\rho^4$ +15$\rho^2$} sin2$\theta$ |
| 63 | 10 | −4 | {+120$\rho^{10}$ −252$\rho^8$ +168$\rho^6$ −35$\rho^4$} sin4$\theta$ |
| 64 | 10 | −6 | {+45$\rho^{10}$ −72$\rho^8$ +28$\rho^6$} sin6$\theta$ |
| 65 | 10 | −8 | {+10$\rho^{10}$ −9$\rho^8$} sin8$\theta$ |
| 66 | 10 | −10 | +$\rho^{10}$ · sin10$\theta$ |

Here, the sign ^ represents power, and, for example, ^2 means square. k is a mere serial number.

A method of determining the Zernike expanding coefficient Anm related to the optical path length aberration distribution H(U, V) will be described.

However, as described above, since the Zernike expanding coefficient is defined only inside the unit circle, it is necessary to previously determine a coordinate conversion function configured to convert the coordinates (U, V) on the aberration defining virtual plane (K) into the coordinates ($\alpha$, $\beta$) which is connected to the polar coordinates ($\rho$, $\theta$) by the formula (5) and in which $\alpha^2 + \beta^2 \leq 1$.

In the following description, for ease of explanation, when the Zernike polynomial expanding of the optical path length aberration distribution H(U, V) is described, even if not explicitly referred to, it is premised that the coordinates (U, V) and the coordinates ($\alpha$, $\beta$) are matched applying the coordinate conversion function.

As already known, the Zernike polynomial has such a feature that Zernike polynomials are perpendicular to each other in a unit circle, that is, integration in a unit circle of a product of two Zernike polynomials Znm($\rho$, $\theta$) and Zn'm'($\rho$, $\theta$) is 0 when pairs of orders n, m and n', m' are not the same.

When the pairs of orders n, m and n', m' are the same as each other, the product, that is, a square integration value Snm=$\pi$/(n+1) when the auxiliary order m is 0, and Snm=$\pi$/2(n+1) when the auxiliary order m is not 0.

The Zernike expanding coefficient Anm can be determined by using the orthogonality.

Namely, when any Zernike polynomial of the formula (6), for example, the k-th Zernike polynomial in the serial number is selected, a product of a value of the optical path length aberration H(U, V) desired to be expanded in the coordinates ($\alpha$, $\beta$) and a value of the k-th Zernike polynomial Znm($\rho$, $\theta$) in the same coordinates ($\alpha$, $\beta$) (using coordinate conversion ($\alpha$, $\beta$)→($\rho$, $\theta$) based on the formula (5)) is subjected to numerical integration in a unit circle, that is, the range of $\alpha^2 + \beta^2 \leq 1$. The Zernike expanding coefficient Anm corresponding to the k-th Zernike polynomial Znm($\rho$, $\theta$) can be obtained by dividing the calculated integrated value by the square integration value Snm corresponding to the k-th Zernike polynomial Znm(ρ, θ).

For example, if the Zernike polynomial expanding is performed in a range of n=0, 1, . . . , and 8, paying an attention to 45 serial numbers corresponding to the serial numbers k=1, 2, . . . , and 45 of the formula (6), the acquisition of the Zernike expanding coefficient Anm corresponding to the k-th Zernike polynomial Znm(ρ, θ) may be applied to k=1 to 45.

Since the Zernike polynomial of each k corresponds to aberration classified based on aberrations, the magnitude of the Zernike expanding coefficient Anm of certain k represents the magnitude of aberration of classification corresponding to the relevant k, and thus the optical system (Ot) can be evaluated by the magnitude of the Zernike expanding coefficient.

There is a method of obtaining an expanding coefficient by solving an equation other than the above method using numerical integration.

FIG. 6a is abbreviated as the following formula (7):

$$H(\alpha, \beta) = \Sigma k \{ Ak \cdot Zk(\alpha, \beta) \}.$$

Here, the sum Σ is performed based on the serial number k instead of the pair of the orders n, m, and expression at the coordinates represented explicitly is changed to (α, β), premising that the coordinate conversion (α, β)→(ρ, θ) is used.

Similarly to the above, if expanding is performed by the 45 Zernike polynomials corresponding to the serial numbers k=1, 2, . . . , and 45, since values of 45 Zernike expanding coefficients Ak may be determined, suitable 45 coordinates (αi, βi) i=1, 2, . . . , and 45 holding the optical path length aberration H(U, V) desired to be expanded are selected, and a value of a phase is extracted from data of the optical path length aberration H(U, V) at the coordinates and set to be the left side of the formula (7). If calculation in which a Zernike polynomial Z(α, β) on the right side is based on the coordinates (αi, βi) is performed, the following formula (8) comprising 45 formulae according to a linear combination of 45 unknowns Ak k=1, 2, . . . , and 45 is obtained:

$$H(\alpha 1, \beta 1) = \Sigma k \{ Ak \cdot Zk(\alpha 1, \beta 1) \}$$

$$H(\alpha 2, \beta 2) = \Sigma k \{ Ak \cdot Zk(\alpha 2, \beta 2) \}$$

. . .

$$H(\alpha i, \beta i) = \Sigma k \{ Ak \cdot Zk(\alpha i, \beta i) \}$$

. . . .

Since this is a simultaneous linear equation in which the number of the unknowns and the number of the formulae are the same, it can be solved, and thus, all values of the 45 Zernike expanding coefficients Ak can be determined.

Alternatively, more than 45 coordinates (αi, βi), for example, the coordinates with the number four to five times are selected, and the 45 Zernike expanding coefficients Ak may be determined by a least-squares method (reference: Chapter 8 of "Shinban suchikeisan hando-bukku (New Edition of Numerical Calculation Handbook)", edited by Yutaka OHNO and Kazuo ISODA, Ohmsha, Sep. 1, 1990, first edition, first issue).

This will be hereinafter briefly described.

For example, the 180 coordinates (αi, βi) are taken. The number is four times 45 as the maximum number of k. The number of the coordinates is referred to as I for the sake of simplicity.

In order to determine the coefficient Ak for the unknown of the right side of the formula (7), when there is the measured value H(αi, βi) of H(α, β) at the coordinates (αi, βi) corresponding to i=1, 2, . . . , and I, an error (square sum of the error) from true values of them is minimized, and in accordance with teaching of the least-squares method, the following formula (9) corresponding to each k of k=1 to 45 and comprising 45 formulae is to be solved as a simultaneous linear equation:

$$\Sigma j [\Sigma i \{ Zj(\alpha i, \beta i) \cdot Zk(\alpha i, \beta i) \}] \cdot Aj = \Sigma i \ H(\alpha i, \beta i) \cdot Zk(\alpha i, \beta i)$$

(k=1 to 45).

Here, Σi represents a sum of i=1, 2, . . . , and I, and Σj represents a sum of j=1, 2, . . . , and 45.

Although the formula (8) is somewhat hard to understand, the inside of [ ] of the left side is a numerical value depending on k and a coefficient multiplied to Aj, and thus, the left side is a linear combination of 45 Aj. The right side is also a numerical value depending on k and means that 45 such formulae are present.

When this is visually represented, it is found that the formula (8) is the following formula when a mark □ is a numerical value depending on k:

$$K = 1 : \square \cdot A1 + \square \cdot A2 + \ldots + \square \cdot A45 = \square$$
$$K = 2 : \square \cdot A1 + \square \cdot A2 + \ldots + \square \cdot A45 = \square$$
$$\ldots \vdots \ldots$$
$$K = 45 : \square \cdot A1 + \square \cdot A2 + \ldots + \square \cdot A45 = \square.$$

Namely, since the formula (8) is a simultaneous linear equation including 45 unknowns Aj and comprising 45 formulae, Aj j=1, 2, . . . , and 45 can be determined by solving this simultaneous linear equation.

In the above description, although there has been described the example in which in the formula (6), when the Zernike polynomial expanding in the range of the main order n=0, 1, . . . , and 8 is adopted, 45 serial numbers corresponding to the serial numbers k=1, 2, . . . , and 45 are handled, the number of the main orders to be adopted may be determined according to accuracy desired to be achieved.

For example, when it is determined that the main order n is up to 6, the serial number k may be up to 28. When it is determined that the main order n is up to 10, the serial number k may be up to 66.

Hereinabove, as an embodiment of the optical system evaluation method of this invention, the method applied to evaluation using OTF and Zernike polynomial expanding has been described. However, since acquisition of the optical path length aberration distribution H(U, V) of the optical system based on this invention is equal to observation of the optical system with an interferometer, this invention is applicable to all optical system evaluation techniques using the interferometer.

The invention is applicable in industry of effectively using a method of calculating OTF and Zernike expanding coefficients, for example, and thereby efficiently acquiring a phase distribution of light with respect to each input image point that is useful when the optical system is evaluated, including a case where a lens inspection device or the like includes aberration as designed, error in profile of a refractive surface or a reflective surface of each image forming optical element, and defects such as eccentricity, surface distance error, and assembly error such as tilt.

What is claimed is:

1. An optical system phase acquisition method of calculating a broad sense phase distribution $\Psi sj(u, v)$ by calculating process by a processing apparatus (Up) in an optical system that comprises an optical system (Ot) configured of one or more image forming optical elements, a plurality of input image points (Psj) (j=1, 2, . . . applies similarly hereafter), and a phase defining plane (T) located at a prescribed relative position with respect to an output side of the optical system (Ot), the broad sense phase distribution $\Psi sj(u, v)$ being information associated with a phase distribution derived from the input image points (Psj) on the phase defining plane (T), the method comprising:

a step (a1) of arranging an imaging element (Uf) on the optical system (Ot) and the output side of the optical system (Ot);

a step (a2) of arranging the plurality of input image points (Psj) on an input side of the optical system (Ot);

a step (a3) of illuminating the optical system (Ot) by input light fluxes (Fsj) emitted from the plurality of input image points (Psj), and illuminating output light fluxes (Foj) outputted from the optical system (Ot) to the imaging element (Uf);

a step (a4) of acquiring interference image data (Df) that collectively includes information of an interference image about the plurality of input image points (Psj) by imaging the interference image by the imaging element (Uf), the interference image being generated by superimposing a reference light flux (Fr) coherent with the output light fluxes (Foj) to the output light fluxes (Foj);

a step (a5) of the imaging element (Uf) transmitting the interference image data (Df) to the processing apparatus (Up);

a step (b1) of performing, by the processing apparatus (Up), diffractive optical light propagation simulation to a separation reconstruction surface (Sg) which is at a position where the output light fluxes (Foj) separates into respective light fluxes and reconstructing the output light fluxes (Foj) in the separation reconstruction surface (Sg) based on the interference image data (Df), and thereafter calculating a broad sense phase distribution $\Psi gj(u'', v'')$ in the separation reconstruction surface (Sg) associated with only light emitted from one input image point (Psj) by the calculating process; and a step (b2) of performing, by the processing apparatus (Up), diffractive optical light propagation simulation based on the broad sense phase distribution $\Psi gj(u'', v'')$ to calculate a broad sense phase distribution $\Psi sj(u, v)$ belonging to the input image point (Psj) on the phase defining plane (T) by the calculating process.

2. The optical system phase acquisition method according to claim 1, further comprising:

a step (a6) of arranging a relay optical system (Oq) between the optical system (Ot) and the imaging element (Uf), wherein the step (a3) is a step in which the output light fluxes (Foj) outputted from the optical system (Ot) are inputted to the relay optical system (Oq) and the imaging element (Uf) is illuminated with a relay output light flux outputted from the relay optical system (Oq), and the step (a4) is a step in which the imaging element (Uf) images the reference image generated by superimposing the reference light flux (Fr) to the relay output light flux.

3. An optical system evaluation method of evaluating the optical system (Ot) by the calculating process performed by the processing apparatus (Up), the method using the optical system phase acquisition method that uses the input image points and the processing apparatus according to claim 1, this method comprising:

after the broad sense phase distribution $\Psi sj(u, v)$ on the phase defining plane (T) with respect to the input image point (Psj) is calculated by the processing apparatus (Up) performing the step (b2), a step (c1) of calculating an optical path length extending from a position of arbitrarily provided coordinates (U, V) on an aberration defining virtual plane to an ideal output image point conjugate to the input image point (Psj), and calculating an optical path length aberration distribution H(U, V) on the aberration defining virtual plane, based on the broad sense phase distribution $\Psi sj(u, v)$ by the calculating process by the processing apparatus (Up); and a step (c2) of evaluating the optical system (Ot) based on the optical path length aberration distribution H(U, V) by the calculating process by the processing apparatus (Up).

* * * * *